United States Patent
Winfrey

(10) Patent No.: US 7,264,255 B1
(45) Date of Patent: Sep. 4, 2007

(54) SYNCHRONIZED MID AND FORWARD MOTOR CYCLE FOOT CONTROLS

(76) Inventor: Jeff Winfrey, 342 Channing Way, Pacifica, CA (US) 94044

( * ) Notice: Subject to any disclaimer, the term of this patent is extended or adjusted under 35 U.S.C. 154(b) by 411 days.

(21) Appl. No.: 10/898,088

(22) Filed: Jul. 19, 2004

(51) Int. Cl.
*B62M 29/00* (2006.01)
*B62H 7/00* (2006.01)

(52) U.S. Cl. .............. 280/219; 280/293; 280/336; 280/291; 188/181 A; 74/564

(58) Field of Classification Search ............ 180/219, 180/293, 336, 291; 188/181 A; 74/564
See application file for complete search history.

(56) References Cited

U.S. PATENT DOCUMENTS

| | | | |
|---|---|---|---|
| 2,638,175 A | | 5/1953 | Poulsen |
| 3,935,916 A | | 2/1976 | Ferraro |
| 4,598,954 A | | 7/1986 | Hayashi |
| 5,354,086 A | * | 10/1994 | Mueller ............... 280/291 |
| 6,394,214 B1 | * | 5/2002 | Hahm ................... 180/230 |
| 7,040,442 B2 | * | 5/2006 | McWhorter ........... 180/219 |
| 2005/0279555 A1 | * | 12/2005 | Suzuki .................. 180/219 |
| 2006/0032688 A1 | * | 2/2006 | Sanchez et al. ....... 180/219 |

* cited by examiner

*Primary Examiner*—Lesley D. Morris
*Assistant Examiner*—Marlon Arce-Diaz

(57) ABSTRACT

A control linkage system for permitting a user to control functions of a motorcycle from different foot positions. The control linkage system includes a shifting assembly being designed for being operationally coupled to a transmission of the motorcycle for permitting the user to actuate the shifting assembly to shift the transmission of the motorcycle to change gears. The shifting assembly is designed for permitting the user to position a foot of the user in a variety of positions A braking assembly is designed for being operationally coupled to a rear brake system of the motorcycle whereby the braking assembly is positioned on an opposite side of the motorcycle from the shifting assembly for permitting the user to actuate a rear brake of the motorcycle to slow the motorcycle. The braking assembly is designed for permitting a foot of the user to be positioned in a variety of positions.

12 Claims, 4 Drawing Sheets

SYNCHRONIZED MID AND FORWARD MOTOR CYCLE FOOT CONTROLS

I. BACKGROUND OF THE INVENTION

The present invention relates to motorcycle control systems and more particularly pertains to a new control linkage system for permitting a user to control functions of a motorcycle from different foot positions.

II. DESCRIPTION OF THE PRIOR ART

The use of motorcycle control systems is known in the prior art. U.S. Pat. No. 2,638,175 describes a device for providing a combined brake and starter lever for a power bike. Another type of motorcycle control system is U.S. Pat. No. 3,935,916 having a control system with a pair of tandem mounted controls to allow an instructor to control the steering and braking from a position behind the student learning to operate a motorcycle. U.S. Pat. No. 4,598,954 has a device for linking the brakes of motorcycle to their respective actuators or to have one of the actuators actuate both brakes.

While these devices fulfill their respective, particular objectives and requirements, the need remains for a device that has certain improved features that allows the user to control the transmission and rear brake of the motorcycle from the various foot positions available to the user riding the motorcycle.

III. SUMMARY OF THE INVENTION

The present invention meets the needs presented above by providing a shifting assembly operationally coupled to the transmission to allow the user to shift the transmission between gears from either foot position and a braking assembly operationally coupled to the braking system to allow the user to apply the brakes from either foot position.

To this end, the present invention generally comprises a shifting assembly being designed for being operationally coupled to a transmission of the motorcycle. The shifting assembly is designed for permitting the user to position a foot of the user in a variety of positions. The shifting assembly is designed for permitting the user to actuate the shifting assembly to shift the transmission of the motorcycle to change gears when the foot of the user is positioned on the shifting assembly. A braking assembly is designed for being operationally coupled to a rear brake system of the motorcycle whereby the braking assembly is positioned on an opposite side of the motorcycle from the shifting assembly. The braking assembly is designed for permitting a foot of the user to be positioned in a variety of positions. The braking assembly is designed for permitting the user to actuate a rear brake of the motorcycle to slow the motorcycle when the braking assembly is actuated by the user.

There has thus been outlined, rather broadly, the more important features of a control linkage system for use in combination with a motorcycle in order that the detailed description thereof that follows may be better understood, and in order that the present contribution to the art may be better appreciated. There are additional features of the control linkage system for use in combination with a motorcycle that will be described hereinafter and which will form the subject matter of the claims appended hereto.

In this respect, before explaining at least one embodiment of the control linkage system for use in combination with a motorcycle in detail, it is to be understood that the control linkage system for use in combination with a motorcycle is not limited in its application to the details of construction and to the arrangements of the components set forth in the following description or illustrated in the drawings. The control linkage system for use in combination with a motorcycle is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present control linkage system for use in combination with a motorcycle. It is important, therefore, that the claims be regarded as including such equivalent constructions insofar as they do not depart from the spirit and scope of the present invention.

It is therefore an object of present invention is to provide a new control linkage system for use in combination with a motorcycle that allows a user to shift positioning of their feet while ridding a motorcycle and retain control of shifting and braking.

It is another object of the present invention to provide a control linkage system for use in combination with a motorcycle for scrubbing articles which has all of the advantages of the prior art and none of the disadvantages.

It is another object of the present invention to provide a control linkage system for use in combination with a motorcycle which may be easily and efficiently manufactured and marketed.

It is another object of the present invention to provide a control linkage system for use in combination with a motorcycle which is of durable and reliable construction.

It is yet another object of the present invention to provide a control linkage system for use in combination with a motorcycle which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
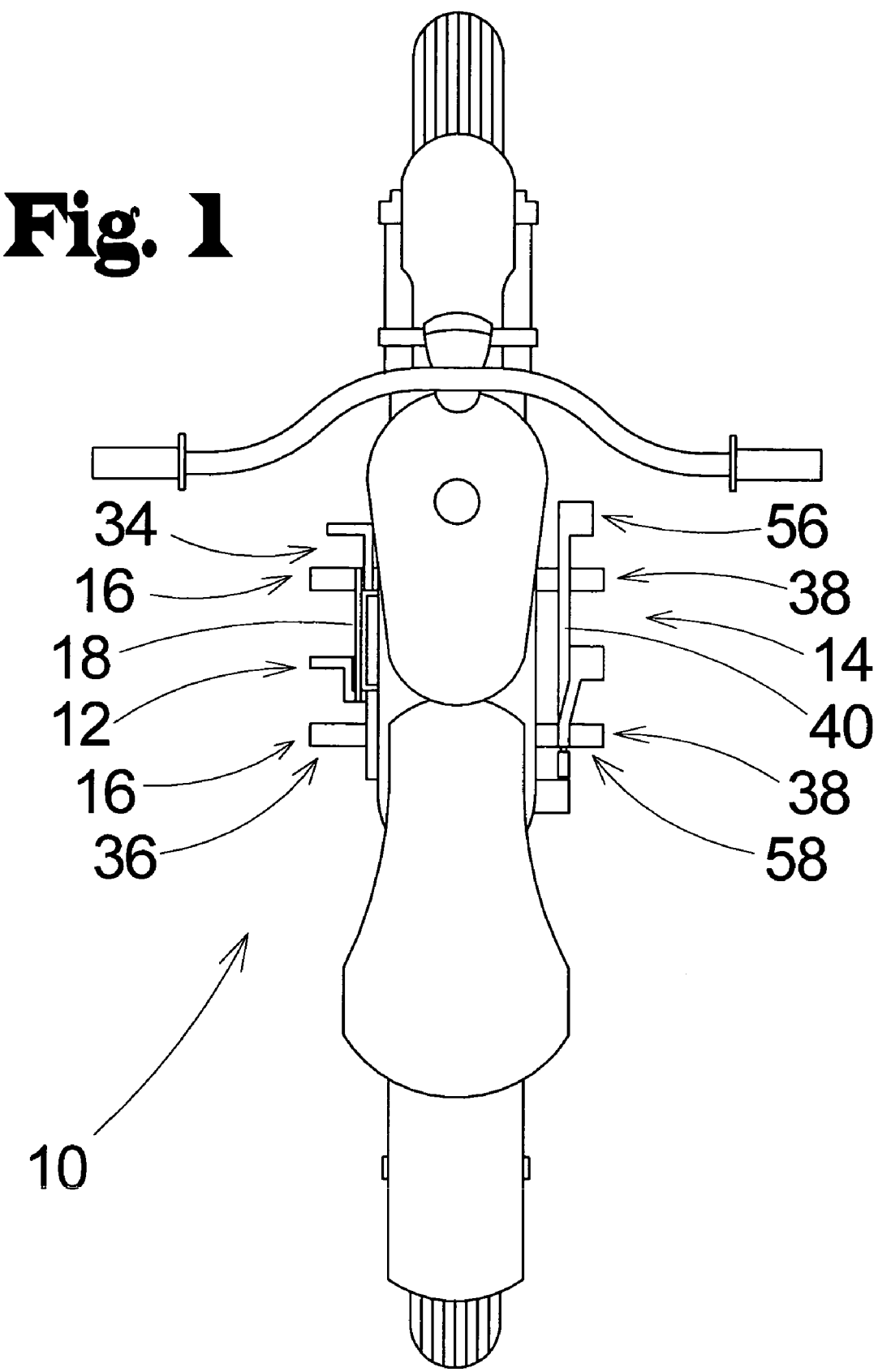
FIG. 1 is a top view of a new control linkage system according to the present invention shown installed on a motorcycle.
Figure 2:
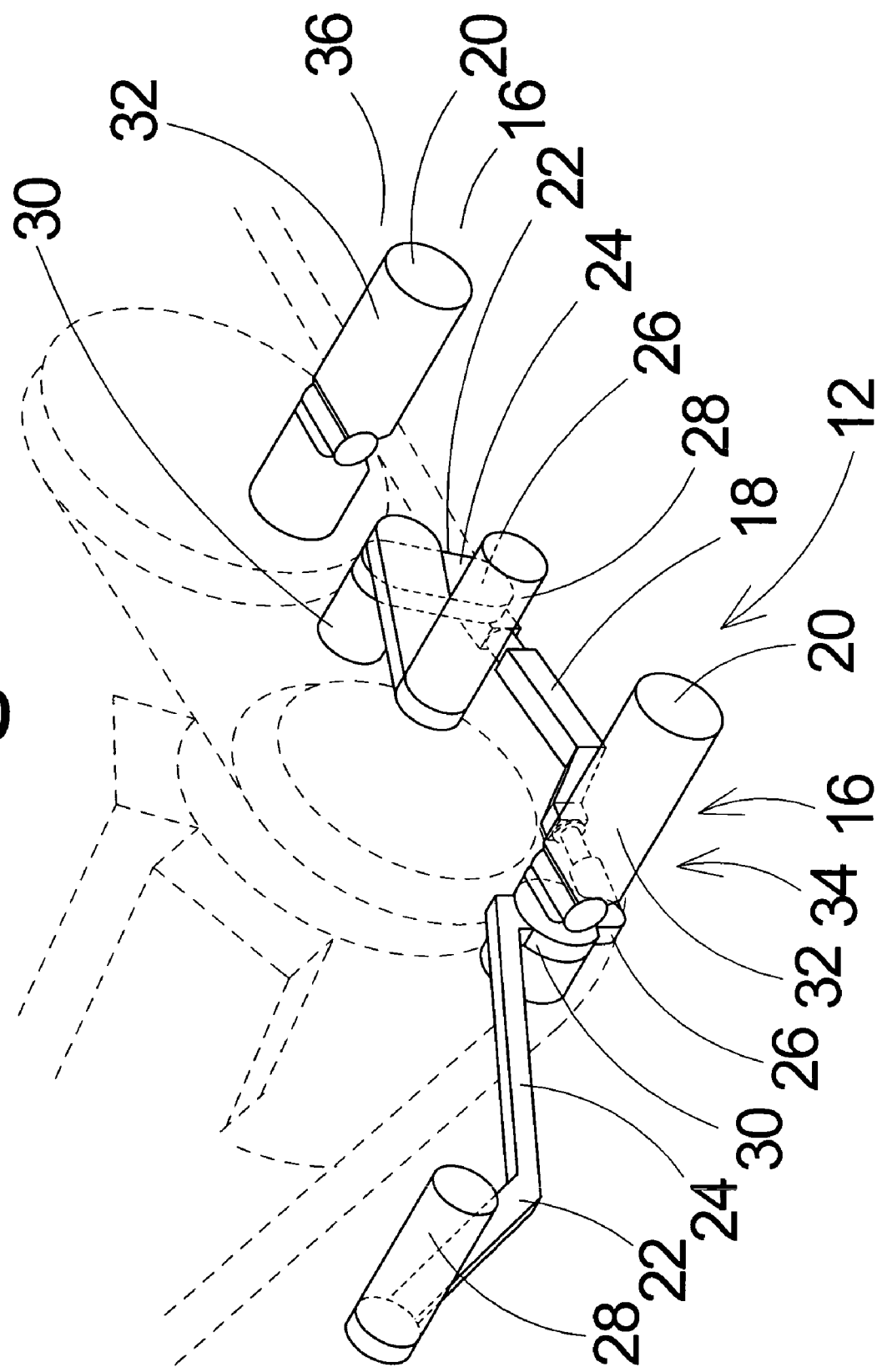
FIG. 2 is a perspective view of the shifting assembly of the present invention.
Figure 3:
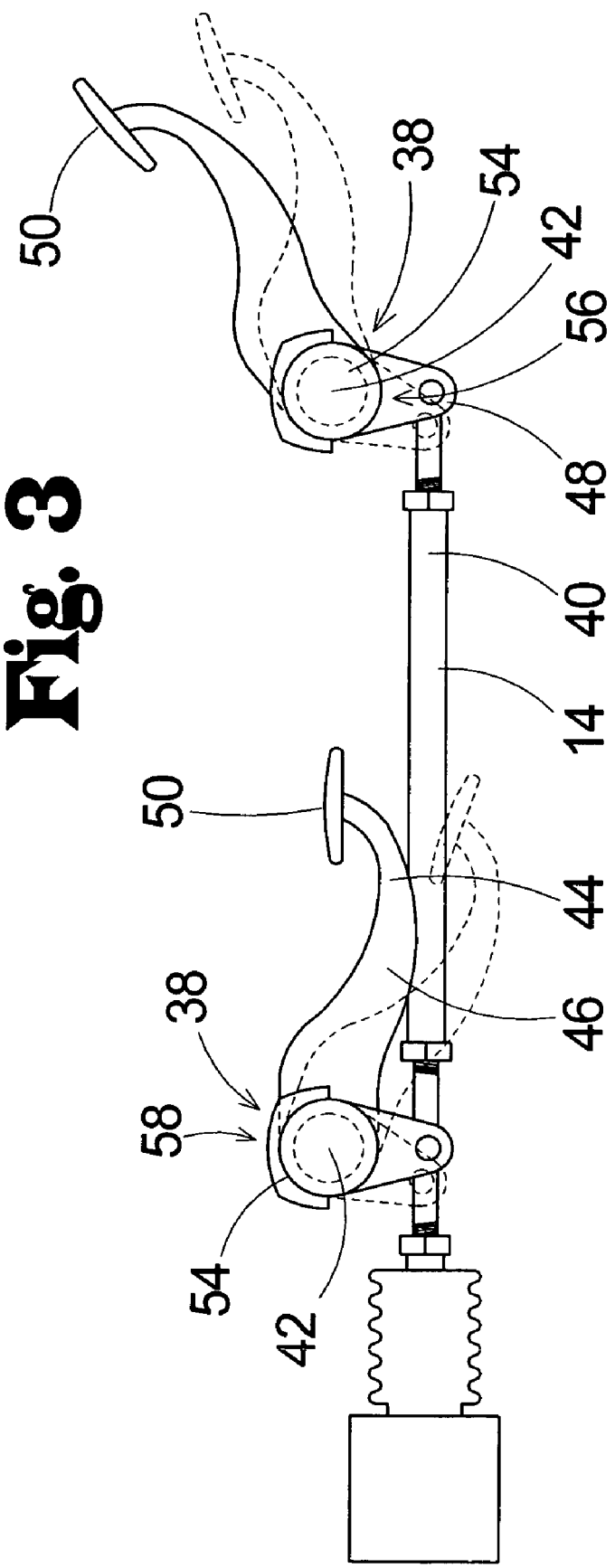
FIG. 3 is a perspective view of the braking assembly of the present invention.
Figure 4:
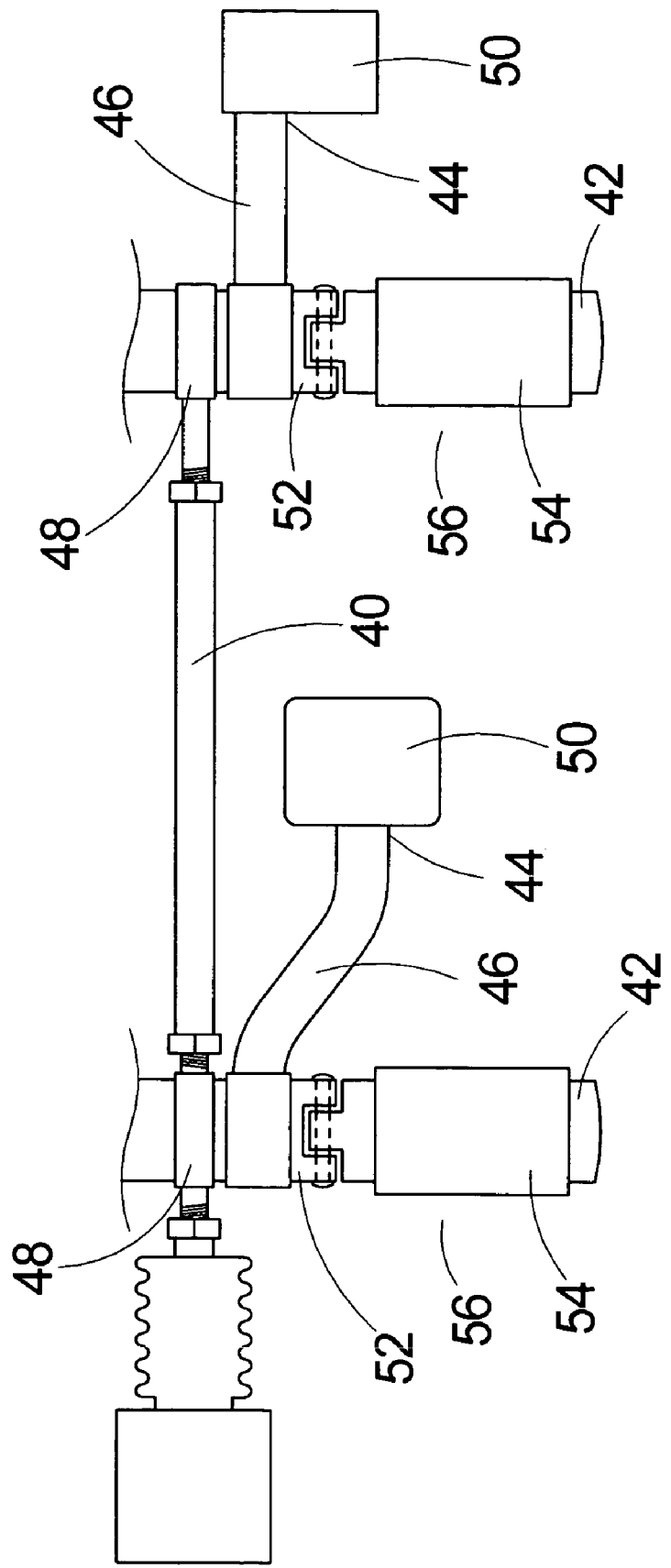
FIG. 4 is an enlarged front view of the rear shift lever assembly of the present invention.

With reference now to the drawings, and in particular to FIGS. 1 through 4 thereof, a new control linkage system embodying the principles and concepts of the present invention and generally designated by the reference numeral 10 will be described.

As best illustrated in FIGS. 1 through 4, the control linkage system 10 generally comprises a shifting assembly 12 being designed for being operationally coupled to a transmission of the motorcycle. The shifting assembly 12 is designed for permitting the user to position a foot of the user in a variety of positions. The shifting assembly 12 is designed for permitting the user to actuate the shifting assembly 12 to shift the transmission of the motorcycle to change gears when the foot of the user is positioned on the shifting assembly 12.

A braking assembly 14 is designed for being operationally coupled to a rear brake system of the motorcycle whereby the braking assembly 14 is positioned on an opposite side of the motorcycle from the shifting assembly 12. The braking assembly 14 is designed for permitting a foot of the user to be positioned in a variety of positions. The braking assembly 14 is designed for permitting the user to actuate a rear brake of the motorcycle to slow the motorcycle when the braking assembly 14 is actuated by the user.

The shifting assembly 12 comprises a pair of shift lever assemblies 16 and a shift linkage arm 18. The shift linkage arm 18 is operationally coupled between the shifting lever assemblies whereby the shift linkage arm 18 actuates one of the shift lever assemblies 16 when the other one of the shift lever assemblies 16 is actuated by the user. One of the shift lever assemblies 16 is designed for supporting the foot of the user when the foot of the user is positioned on one of the shift lever assemblies 16.

Each of the shift lever assemblies 16 comprises a foot peg 20 and a lever member 22. The foot peg 20 of each of the shift lever assemblies 16 is designed for being coupled to the motorcycle whereby the foot peg 20 of one of the shift lever assemblies 16 supports the foot of the user when the user is riding the motorcycle. The lever member 22 of each of the shift lever assemblies 16 is rotatable with respect to the foot peg 20 of the associated one of the shift lever assemblies 16. The shift linkage arm 18 is operationally coupled to the lever member 22 of each of the shift lever assemblies 16 whereby the shift linkage arm 18 rotates the lever member 22 of one of the shift lever assemblies 16 when the lever member 22 of the other one of the shift lever assemblies 16 is actuated by the foot of the user.

The lever member 22 of each of the shift lever assemblies 16 comprises an actuation portion 24 and a mounting portion 26. The actuation portion 24 of the lever member 22 is designed for being rotationally coupled to the motorcycle. The mounting portion 26 is coupled to the actuation portion 24. The shift linkage arm 18 is operationally coupled to the mounting portion 26 of the lever member of each of the shift lever assemblies 16 whereby the shift linkage arm 18 rotates the lever member 22 on one of the shift lever assemblies 16 when the lever member 22 of the other one of the shift lever assemblies is actuated by the user.

The lever member 22 of each of the shift lever assemblies 16 comprises a toe portion 28. The toe portion 28 is coupled to the actuation portion 24 of the lever member 22 whereby the toe portion 28 is positioned opposite the mounting portion 26 of the lever member 22 of the associated one of the shift lever assemblies 16. The toe portion 28 is positioned substantially parallel to the foot peg 20 of the associated one of the shift lever assemblies 16. The toe portion 28 is designed for being engaged by toes of the foot of the user for actuating the lever member 22 of the associated one of the shift lever assemblies 16.

The foot peg 20 of each of the shift lever assemblies 16 comprises a yoke portion 30 and a support portion 32. The support portion 32 is rotatably coupled to the yoke portion 30 whereby the support portion 32 is selectively pivoted between a deployed position and a raised position. The deployed position of the support portion 32 is defined by the support portion 32 extending outwardly from the motorcycle whereby the support portion 32 selectively supports the foot of the user. The raised portion is defined by the support portion 32 by positioned substantially parallel to the motorcycle to inhibit the foot peg 20 from being broken away from the motorcycle when the motorcycle is laying on a side of the motorcycle.

The shift lever assemblies 16 comprises a front shift lever assembly 34 and a rear shift lever assembly 36. The front shift lever assembly 34 is designed for being coupled to the motorcycle whereby the front shift lever assembly 34 is positioned towards the front of an engine of the vehicle to permit the user to ride with the foot of the user positioned forward of the user. The rear shift lever assembly 36 is designed for being coupled to the motorcycle whereby the rear shift lever assembly 36 is positioned substantially towards the middle of the engine of the motorcycle to permit the rider to ride with the foot of the user positioned substantially below the user. The lever member 22 of the rear shift lever assembly 36 is designed for being operationally coupled to the transmission of the motorcycle whereby the lever member 22 of the rear shift lever assembly 36 actuates the transmission to shift gears when the lever member 22 is actuated with respect to the transmission.

The braking assembly 14 comprises a pair of brake lever assemblies 38 and a brake linkage arm 44. The brake linkage arm 44 is operationally coupled to the brake lever assemblies 38 whereby the brake linkage arm 44 actuates one of the brake lever assemblies 38 when the other one of the brake lever assemblies 38 is actuated by the user. One of the brake lever assemblies 38 is designed for supporting the foot of the user when the foot of the user is positioned on one of the brake lever assemblies 38. The brake linkage arm 44 is operationally coupled to the brake system of the motorcycle whereby the brake linkage arm 44 actuates the brake system to slow the motorcycle when one of the brake lever assemblies 38 is actuated by the user.

Each of the brake lever assemblies 38 comprises a foot member 42 and an arm member 44. The foot member 42 of each of the brake lever assemblies 38 is designed for being coupled to the motorcycle whereby the foot member 42 of one of the brake lever assemblies 38 supports the foot of the user when the user is riding the motorcycle. The arm member 44 of each of the brake lever assemblies 38 is rotatably to the foot member 42 of the associated one of the brake lever assemblies 38. The brake linkage arm 44 is operationally coupled to the arm member 44 of each of the brake lever assemblies 38 whereby the brake linkage arm 44 rotates the arm member 44 of one of the brake lever assemblies 38 when the arm member 44 of the other one of the brake lever assemblies 38 is actuated by the foot of the user.

The arm member 44 of each of the brake lever assemblies 38 comprises an lever portion 46 and a linkage portion 48. The lever portion 46 of the arm member 44 is rotationally coupled to the foot member 42 of the associated one of the brake lever assemblies 38. The linkage portion 48 is coupled to the lever portion 46. The brake linkage arm 44 is operationally coupled to the linkage portion 48 of the lever member of each of the brake lever assemblies 38 whereby the brake linkage arm 44 rotates the arm member 44 on one of the brake lever assemblies 38 when the arm member 44 of the other one of the shift lever assemblies is actuated by the user.

The arm member 44 of each of the brake lever assemblies 38 comprises a toe plate 50. The toe plate 50 is coupled to the lever portion 46 of the arm member 44 whereby the toe plate 50 is positioned opposite the linkage portion 48 of the arm member 44 of the associated one of the brake lever assemblies 38. The toe plate 50 is positioned substantially parallel to the foot member 42 of the associated one of the brake lever assemblies 38. The toe plate 50 is designed for being engaged by toes of the foot of the user for actuating the arm member 44 of the associated one of the brake lever assemblies 38.

The foot member 42 of each of the brake lever assemblies 38 comprises a fixed portion 52 and a rest portion 54. The rest portion 54 is rotatably coupled to the fixed portion 52 whereby the rest portion 54 is selectively pivoted between a deployed position and a raised position. The deployed position of the rest portion 54 is defined by the rest portion 54 extending outwardly from the motorcycle whereby the rest portion 54 selectively supports the foot of the user. The raised portion is defined by the rest portion 54 by positioned substantially parallel to the motorcycle to inhibit the foot member 42 from being broken away from the motorcycle when the motorcycle is laying on a side of the motorcycle.

The brake lever assemblies 38 comprises a front brake lever assembly 56 and a rear brake lever assembly 58. The front brake lever assembly 56 is designed for being coupled to the motorcycle whereby the front brake lever assembly 56 is positioned towards the front of an engine of the vehicle to permit the user to ride with the foot of the user positioned forward of the user. The rear brake lever assembly 58 is designed for being coupled to the motorcycle whereby the rear brake lever assembly 58 is positioned substantially towards the middle of the engine of the motorcycle to permit the rider to ride with the foot of the user positioned substantially below the user.

In use, the shifting assembly 12 and the brake assembly are operationally coupled to the motorcycle. The user places a foot on the foot peg 20 of one of the shift lever assemblies 16 and the other foot on the foot member 42 of one of the brake lever assemblies 38. The user can then actuate the lever member 22 of the associated one of the shift lever assemblies 16 to shift the transmission of the motorcycle between gears. The arm member 44 of the associated one of the brake lever assemblies 38 is actuated by the foot of the user positioned on one of the brake lever assemblies 38 to actuate the brake system and slow the motorcycle.

A primary intention of this invention is to afford a motorcycle rider two different riding positions. One of the positions involves having the motorcycle rider in a sport-like riding stance which allows the rider to have their feet positioned in the middle of the bike to keep a more stable center of gravity while riding over more demanding terrain. The other riding position would allow the rider to stretch their legs out in a forward direction, thus creating a more relaxed riding position more suited to highway cruising.

Each riding position will afford the rider full control of the shifting and rear braking duties associated with safely controlling a motorcycle while in transit. Furthermore, the rider will be much more comfortable on extended rides due to the ability to switch foot positions which will significantly relieve cramping and stiffness in the legs and thighs.

With respect to the above description then, it is to be realized that the optimum dimensional relationships for the parts of the invention, to include variations in size, materials shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A linkage system for shifting and braking a motorcycle from various foot positions of a single driver, the motorcycle having a seat adjacent to and directly behind a gasoline tank for the driver, the linkage system comprising:

a first foot peg positioned directly below a front portion of the seat for supporting the foot of the driver, a second foot peg positioned in front of the seat directly below the gasoline tank for supporting the foot of the driver, a first shift lever assembly coupled to and operationally positioned in front of the first foot peg, a second shift lever assembly coupled to and operationally positioned in front of the second foot peg, a shift linkage arm operationally coupled between the first and second shifting lever assemblies wherein the shift linkage arm actuates one of the shift lever assemblies when the other one of the shift lever assemblies is actuated by the user, each of the shift lever assembly supporting the foot of the user when the foot of the user is positioned on the shift lever assembly; and a braking assembly operationally coupled to a rear brake system of the motorcycle such that said braking assembly is positioned on an opposite side of the motorcycle from said shifting assembly, said braking assembly permitting a foot of the user to be positioned in a variety of positions, said braking assembly permitting the user to actuate a rear brake of the motorcycle to slow the motorcycle when the braking assembly is actuated by the user.

2. The linkage system as set forth in claim 1, wherein the foot peg of associated with each shift lever assembly supports the foot of the user when the user is riding the motorcycle, the shift lever assembly rotatable with respect to the foot peg of the associated shift lever assembly, such that each shift lever assembly rotates relative to the respective foot peg when the shift lever assembly is actuated by the foot of the user.

3. The linkage system as set forth in claim 2, further wherein each of shift lever assembly comprises an actuation portion and a mounting portion, said actuation portion rotationally coupled to the motorcycle, said mounting portion coupled to said actuation portion, said shift linkage arm being operationally coupled to said mounting portion of each of said shift lever assemblies such that said shift linkage arm rotates the second shift lever assembly when said lever member of the other one of said shift lever assemblies is actuated by the user.

4. The linkage system as set forth in claim 3, further wherein said each of said shift lever assemblies comprises a toe portion, said toe portion being coupled to said actuation portion such that said toe portion is positioned opposite said mounting portion of the associated one of said shift lever assemblies, said toe portion being positioned substantially parallel to said foot peg of the associated one of said shift lever assemblies, said toe portion being adapted for being engaged by toes of the foot of the user for actuating the associated one of said shift lever assemblies.

5. The linkage system as set forth in claim 2, further wherein said foot peg of each of said shift lever assemblies comprises a yoke portion and a support portion, said support portion being rotatably coupled to said yoke portion such that said support portion is selectively pivoted between a deployed position and a raised position, said deployed position of said support portion being defined by said support portion extending outwardly from said motorcycle such that said support portion selectively supports the foot of the user, said raised portion being defined by said support portion by positioned substantially parallel to the motorcycle to inhibit said foot peg from being broken away from the motorcycle when the motorcycle is laying on a side of the motorcycle.

6. The linkage system as set forth in claim 1, further wherein said braking assembly comprises a pair of brake lever assemblies and a brake linkage arm, said brake linkage arm being operationally coupled to said brake lever assemblies such that said brake linkage arm actuates one of said brake lever assemblies when the other one of said brake lever assemblies is actuated by the user, one of said brake lever assemblies being adapted for supporting the foot of the user when the foot of the user is positioned on one of said brake lever assemblies, said brake linkage arm being operationally coupled to the brake system of the motorcycle such that said brake linkage arm actuates the brake system to slow the motorcycle when one of said brake lever assemblies is actuated by the user.

7. The linkage system as set forth in claim 6, further wherein each of said brake lever assemblies comprises a foot member and an arm member, said foot member of each of said brake lever assemblies being adapted for being coupled to the motorcycle such that said foot member of one of said brake lever assemblies supports the foot of the user when the user is riding the motorcycle, said arm member of each of said brake lever assemblies being rotatably to said foot member of the associated one of said brake lever assemblies, said brake linkage arm being operationally coupled to said arm member of each of said brake lever assemblies such that said brake linkage arm rotates said arm member of one of said brake lever assemblies when said arm member of the other one of said brake lever assemblies is actuated by the foot of the user.

8. The linkage system as set forth in claim 7, further wherein said arm member of each of said brake lever assemblies comprises a lever portion and a linkage portion, said lever portion of said arm member being rotationally coupled to said foot member of the associated one of said brake lever assemblies, said linkage portion being coupled to said lever portion, said brake linkage arm being operationally coupled to said linkage portion of said lever member of each of said brake lever assemblies such that said brake linkage arm rotates said arm member on one of said brake lever assemblies when said arm member of the other one of said shift lever assemblies is actuated by the user.

9. The linkage system as set forth in claim 7, further wherein said arm member of each of said brake lever assemblies comprises a toe plate, said toe plate being coupled to said lever portion of said arm member such that said toe plate is positioned opposite said linkage portion of said arm member of the associated one of said brake lever assemblies, said toe plate being positioned substantially parallel to said foot member of the associated one of said brake lever assemblies, said toe plate being adapted for being engaged by toes of the foot of the user for actuating the arm member of the associated one of said brake lever assemblies.

10. The linkage system as set forth in claim 7, further wherein said foot member of each of said brake lever assemblies comprises a fixed portion and a rest portion, said rest portion being rotatably coupled to said fixed portion such that said rest portion is selectively pivoted between a deployed position and a raised position, said deployed position of said rest portion being defined by said rest portion extending outwardly from said motorcycle such that said rest portion selectively supports the foot of the user, said raised portion being defined by said rest portion by positioned substantially parallel to the motorcycle to inhibit said foot member from being broken away from the motorcycle when the motorcycle is laying on a side of the motorcycle.

11. The linkage system as set forth in claim 7, further wherein said brake lever assemblies comprises a front brake lever assembly and a rear brake lever assembly, said front brake lever assembly being adapted for being coupled to the motorcycle such that said front brake lever assembly is positioned towards the front of an engine of the vehicle to permit the user to ride with the foot of the user positioned forward of the user, said rear brake lever assembly being adapted for being coupled to the motorcycle such that said rear brake lever assembly is positioned substantially towards the middle of the engine of the motorcycle to permit the rider to ride with the foot of the user positioned substantially below the user.

12. A linkage system for shifting and braking a motorcycle from various foot positions of a single user, the motorcycle having a seat adjacent to and directly behind a gasoline tank for the driver the linkage system comprising:

a shifting assembly adapted for being operationally coupled to a transmission of the motorcycle, said shifting assembly being adapted for permitting the user to position a foot of the user in a variety of positions, said shifting assembly being adapted for permitting the user to actuate the shifting assembly to shift the transmission of the motorcycle to change gears when the foot of the user is positioned on said shifting assembly, a braking assembly being adapted for being operationally coupled to a rear brake system of the motorcycle such that said braking assembly is positioned on an opposite side of the motorcycle from said shifting assembly, said braking assembly being adapted for permitting a foot of the user to be positioned in a variety of positions, said braking assembly being adapted for permitting the user to actuate a rear brake of the motorcycle to slow the motorcycle when the braking assembly is actuated by the user, said shifting assembly comprising a pair of shift lever assemblies and a shift linkage arm, said shift linkage arm being operationally coupled between said shifting lever assemblies such that said shift linkage arm actuates one of said shift lever assemblies when the other one of said shift lever assemblies is actuated by the user, one of said shift lever assemblies being adapted for supporting the foot of the user when the foot of the user is positioned on one of said shift lever assemblies, each of said shift lever assemblies comprising a foot peg and a lever member, said foot peg of each of said shift lever assemblies being adapted for being coupled to the motorcycle such that said foot peg of one of said shift lever assemblies supports the foot of the user when the user is riding the motorcycle, said lever member of each of said shift lever assemblies being rotatable with respect to said foot peg of the associated one of said shift lever assemblies, said shift linkage arm being operationally coupled to said lever member of each of said shift lever assemblies such that said shift linkage arm rotates said lever member of one of said shift lever assemblies when said lever member of the other one of said shift lever assemblies is actuated by the foot of the user, said lever member of each of said shift lever assemblies comprising an actuation portion and a mounting portion, said actuation portion of said lever member being adapted for being rotationally coupled to the motorcycle, said mounting portion being coupled to said actuation portion, said shift linkage arm being operationally coupled to said mounting portion of said lever member of each of said shift lever assemblies such that said shift linkage arm rotates said lever member on one of said shift lever assemblies when said lever member of the other one of said shift lever assemblies is actuated by the user, said lever member of each of said shift lever assemblies comprising a toe portion, said toe portion being coupled to said actuation portion of said lever member such that said toe portion is positioned opposite said mounting portion of said lever member of the associated one of said shift lever assemblies, said toe portion being positioned substantially parallel to said foot peg of the associated one of said shift lever assemblies, said toe portion being adapted for being engaged by toes of the foot of the user for actuating the lever member of the associated one of said shift lever assemblies, said foot peg of each of said shift lever assemblies comprising a yoke portion and a support portion, said support portion being rotatably coupled to said yoke portion such that said support portion is selectively pivoted between a deployed position and a raised position, said deployed position of said support portion being defined by said support portion extending outwardly from said motorcycle such that said support portion selectively supports the foot of the user, said raised portion being defined by said support portion by positioned substantially parallel to the motorcycle to inhibit said foot peg from being broken away from the motorcycle when the motorcycle is laying on a side of the motorcycle, said shift lever assemblies comprising a front shift lever assembly and a rear shift lever assembly, said front shift lever assembly being adapted for being coupled to the motorcycle such that said front shift lever assembly is positioned towards the front of an engine directly below the gasoline tank of the vehicle to permit the user to ride with the foot of the user positioned forward of the user, said rear shift lever assembly being adapted for being coupled to the motorcycle such that said rear shift lever assembly is positioned substantially towards the middle of the engine directly below the seat of the motorcycle to permit the rider to ride with the foot of the user positioned substantially below the user, said lever member of said rear shift lever assembly being adapted for being operationally coupled to the transmission of the motorcycle such that said lever member of said rear shift lever assembly actuates the transmission to shift gears when said lever member is actuated with respect to the transmission, said braking assembly comprising a pair of brake lever assemblies and a brake linkage arm, said brake linkage arm being operationally coupled to said brake lever assemblies such that said brake linkage arm actuates one of said brake lever assemblies when the other one of said brake lever assemblies is actuated by the user, one of said brake lever assemblies being adapted for supporting the foot of the user when the foot of the user is positioned on one of said brake lever assemblies, said brake linkage arm being operationally coupled to the brake system of the motorcycle such that said brake linkage arm actuates the brake system to slow the motorcycle when one of said brake lever assemblies is actuated by the user, each of said brake lever assemblies comprising a foot member and an arm member, said foot member of each of said brake lever assemblies being adapted for being coupled to the motorcycle such that said foot member of one of said brake lever assemblies supports the foot of the user when the user is riding the motorcycle, said arm member of each of said brake lever assemblies being rotatably to said foot member of the associated one of said brake lever assemblies, said brake linkage arm being operationally coupled to said arm member of each of said brake lever assemblies such that said brake linkage arm rotates said arm member of one of said brake lever assemblies when said arm member of the other one of said brake lever assemblies is actuated by the foot of the user, said arm member of each of said brake lever assemblies comprising an lever portion and a linkage portion, said lever portion of said arm member being rotationally coupled to said foot member of the associated one of said brake lever assemblies, said linkage portion being coupled to said lever portion, said brake linkage arm being operationally coupled to said linkage portion of said lever member of each of said brake lever assemblies such that said brake linkage arm rotates said arm member on one of said brake lever assemblies when said arm member of the other one of said shift lever assemblies is actuated by the user, said arm member of each of said brake lever assemblies comprising a toe plate, said toe plate being coupled to said lever portion of said arm member such that said toe plate is positioned opposite said linkage portion of said arm member of the associated one of said brake lever assemblies, said toe plate being positioned substantially parallel to said foot member of the associated one of said brake lever assemblies, said toe plate being adapted for being engaged by toes of the foot of the user for actuating the arm member of the associated one of said brake lever assemblies, said foot member of each of said brake lever assemblies comprising a fixed portion and a rest portion, said rest portion being rotatably coupled to said fixed portion such that said rest portion is selectively pivoted between a deployed position and a raised position, said deployed position of said rest portion being defined by said rest portion extending outwardly from said motorcycle such that said rest portion selectively supports the foot of the user, said raised portion being defined by said rest portion by positioned substantially parallel to the motorcycle to inhibit said foot member from being broken away from the motorcycle when the motorcycle is laying on a side of the motorcycle, and said brake lever assemblies comprising a front brake lever assembly and a rear brake lever assembly, said front brake lever assembly being adapted for being coupled to the motorcycle such that said front brake lever assembly is positioned towards the front of an engine of the vehicle to permit the user to ride with the foot of the user positioned forward of the user, said rear brake lever assembly being adapted for being coupled to the motorcycle such that said rear brake lever assembly is positioned substantially towards the middle of the engine of the motorcycle to permit the rider to ride with the foot of the user positioned substantially below the user.

* * * * *